(12) United States Patent
Kishi et al.

(10) Patent No.: US 10,914,341 B2
(45) Date of Patent: Feb. 9, 2021

(54) MOTION GUIDE DEVICE

(71) Applicant: THK CO., LTD., Tokyo (JP)

(72) Inventors: Hiroyuki Kishi, Tokyo (JP);
Mitsumasa Wada, Tokyo (JP);
Hiroyoshi Yasutake, Tokyo (JP); Eriko Oshima, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/610,676

(22) PCT Filed: May 23, 2018

(86) PCT No.: PCT/JP2018/019760
§ 371 (c)(1),
(2) Date: Nov. 4, 2019

(87) PCT Pub. No.: WO2018/221333
PCT Pub. Date: Dec. 6, 2018

(65) Prior Publication Data
US 2020/0158172 A1    May 21, 2020

(30) Foreign Application Priority Data
May 31, 2017   (JP) ................................ 2017-107372

(51) Int. Cl.
*F16C 29/06*    (2006.01)
*F16C 33/66*    (2006.01)
(52) U.S. Cl.
CPC ...... *F16C 29/0642* (2013.01); *F16C 29/0652* (2013.01); *F16C 33/6622* (2013.01)
(58) Field of Classification Search
CPC .............. F16C 29/0611; F16C 29/0642; F16C 29/0652; F16C 29/0654; F16C 33/6622
(Continued)

(56) References Cited

U.S. PATENT DOCUMENTS

| 4,850,720 A | 7/1989 | Osawa |
| 5,501,527 A * | 3/1996 | Chang ................. F16C 29/0607 384/45 |
| 6,024,490 A * | 2/2000 | Shirai ................. F16C 29/0609 384/13 |
| 6,250,804 B1 * | 6/2001 | Hsu ..................... F16C 33/6651 384/13 |

(Continued)

FOREIGN PATENT DOCUMENTS

| CN | 102713320 A | 10/2012 |
| CN | 104081069 A | 10/2014 |

(Continued)

OTHER PUBLICATIONS

International Search Report dated Aug. 14, 2018, issued in counterpart International Application No. PCT/JP2018/019760 (2 pages).

(Continued)

*Primary Examiner* — Marcus Charles
(74) *Attorney, Agent, or Firm* — Westerman, Hattori, Daniels & Adrian, LLP

(57) ABSTRACT

The motion guide device includes a lubricant supply passage provided in at least one of a pair of cover members provided to a movable member and configured to supply lubricant to an endless circulation passage, in which the lubricant supply passage includes at least a first lubricant supply passage α formed to extend in a direction orthogonal to a longitudinal direction of the track member from at least one of a left side surface and a right side surface of the cover member, and a second lubricant supply passage β connected to the first lubricant supply passage α, and a passage shape in a place connected to the first lubricant supply passage α of the second lubricant supply passage β is configured as a diameter-expanded hollow section having a diameter more expanded than a passage shape of another place. Thus, a new form of a cover member is provided.

7 Claims, 11 Drawing Sheets

(58) Field of Classification Search
USPC .................................. 384/13, 15, 44–45, 49
See application file for complete search history.

(56) References Cited

U.S. PATENT DOCUMENTS

| | | | | |
|---|---|---|---|---|
| 7,798,716 B2* | 9/2010 | Haub | .................. | F16C 29/0609 |
| | | | | 384/13 |
| 8,662,752 B2* | 3/2014 | Maki | .................. | F16C 33/6681 |
| | | | | 384/13 |
| 9,488,223 B2* | 11/2016 | Roesch | ................. | F16C 29/086 |
| 2002/0164094 A1* | 11/2002 | Luo | ........................ | F16C 29/12 |
| | | | | 384/45 |
| 2004/0175061 A1 | 9/2004 | Chen | | |
| 2009/0196539 A1* | 8/2009 | Pfeuffer | .............. | F16C 33/6659 |
| | | | | 384/45 |
| 2009/0304312 A1* | 12/2009 | Horie | .................. | F16C 29/0635 |
| | | | | 384/13 |
| 2012/0328221 A1 | 12/2012 | Maki et al. | | |
| 2014/0079345 A1* | 3/2014 | Li | ...................... | F16C 33/6681 |
| | | | | 384/13 |
| 2015/0023618 A1 | 1/2015 | Mizumura | | |

FOREIGN PATENT DOCUMENTS

| | | | | |
|---|---|---|---|---|
| CN | 105121874 A | | 12/2015 | |
| CN | 108662017 A | * | 10/2018 | .............. F16C 29/04 |
| JP | 63-91349 U | | 6/1988 | |
| JP | 2004-225758 A | | 8/2004 | |
| JP | 2005-207469 A | | 8/2005 | |
| JP | 2005-221008 A | | 8/2005 | |
| JP | 2008-164160 A | | 7/2008 | |
| JP | 2012-229814 A | | 11/2012 | |
| WO | WO-9312351 A1 | * | 6/1993 | .......... F16C 33/6648 |
| WO | WO-2007074754 A1 | * | 7/2007 | .......... F16C 33/6622 |
| WO | WO-2013065663 A1 | * | 5/2013 | .......... F16C 29/0638 |
| WO | WO-2014034083 A1 | * | 3/2014 | .......... F16C 29/0609 |
| WO | WO-2014064917 A1 | * | 5/2014 | .......... F16C 33/6622 |

OTHER PUBLICATIONS

Office Action dated May 12, 2020, issued in counterpart CN Application No. 201880030725.1, with English Translation. (8 Pages).

* cited by examiner

MOTION GUIDE DEVICE

CROSS REFERENCE TO RELATED APPLICATION

This application is a 371 of International Application No. PCT/JP2018/019760 filed on May 23, 2018, which is based upon and claims the benefit of priority from the prior Japanese Patent Application No. 2017-107372 filed on May 31, 2017, the entire contents of which are incorporated herein by reference.

TECHNICAL FIELD

The present invention relates to an improvement of a motion guide device such as a liner guide for guiding a movable body like a table to straight-line motion or curved-line motion.

BACKGROUND ART

A motion guide device having rolling members like balls or rollers in a guide portion as a mechanical element for guiding straight-line motion or curved-line motion of a movable body such as a table can provide nimble movement, and is therefore used in various fields such as robots, machine tools, apparatuses for manufacturing semiconductors and liquid crystals, and medical apparatuses.

A liner guide, a kind of motion guide device, includes a track rail attached to a base, and a movable block fixed to the track rail relatively movably and attached to a movable body. In the track rail, a rolling member rolling surface extending along the longitudinal direction is formed. In the movable block, a loaded rolling member rolling surface facing the rolling member rolling surface is formed, and a rolling member circulation passage to circulate rolling members is provided. The rolling members are arranged freely rollably between the rolling member rolling surface of the track rail and the loaded rolling member rolling surface of the movable block. When the movable block makes straight-line motion relatively to the track rail, the rolling members arranged between the track rail and the movable block make rolling motion, and circulate through the rolling member circulation passage.

When using such a rolling-type motion guide device, it is necessary to make good lubrication, that is, making a film of oil or grease between a rolling member and a rolling surface, to prevent direct contact between metals. This is because use on a no-grease supply basis increases the abrasion of the rolling member and the rolling surface, and causes an earlier lifetime.

There are many methods for supplying lubricant to a motion guide device, and it is a way to supply lubricant via a grease supply nipple attached to a movable block of the motion guide device. In general, grease supply nipples are attached to cover members set on a front end surface and a rear end surface of a movable block, and lubricant supply passages connecting these grease supply nipples and a rolling member circulation passage together are formed in the interior of the movable block and a side in contact with an end surface of the movable block. When lubricant such as oil or grease is supplied to the grease supply nipples, the lubricant is applied to rolling members via the lubricant supply passages.

Lubricant supply passages formed to a cover member are required to distribute lubricant equally to a plurality of rolling member circulation passages. For example, Patent Literature 1 below discloses the following form: a plurality of lubricant that link each of grease supply nipples and the respective rolling member circulation passages together, are formed so as to be substantially uniform in shape, formation position, passage length, etc. According to patent Literature 1 below, it is able to distribute lubricant averagely to each rolling member circulation passages and to achieve proper lubrication because of the plural lubricant supply passages having a substantially uniform form.

Meanwhile, an attachment position of the grease supply nipple attached to the cover member needs to be arbitrarily altered in accordance with a working condition, a surrounding environment, etc. of the motion guide device. Specifically, it needs to be kept ready to be installed at a front end or a rear end in a moving direction of the movable block toward the track rail, at a left side surface or a right side surface, etc. Thus, conventional technology typified by Patent Literature 1 below or the like has employed a configuration like the following: lubricant supply passages are formed to a front surface or left and right side surfaces of a cover member, and a grease supply nipple is able to be installed to a lubricant supply passage in any of these positions.

CITATION LIST

Patent Literature

Patent Literature 1: JP 2005-207469 A

DISCLOSURE OF THE INVENTION

Problems to be Solved by the Invention

Here, to achieve proper lubrication in a case of supplying lubricant from lubricant supply passages formed to a left side surface and a right side surface of a cover member, it has been necessary that tunnel-like lubricant supply passages be once formed from the left side surface and the right side surface of the cover member toward a central portion to supply lubricant and that a plurality of lubricant supply passages having a substantially uniform form for averagely distributing lubricant from the position of the central portion to each rolling member circulation passage be formed.

However, in a case of forming tunnel-like lubricant supply passages from the left side surface and the right side surface of the cover member toward the central portion of the cover member, shapes such as bolt attachment holes exist on the formation passages unavoidably, and hence constraints in terms of design have been present on the formation of lubricant supply passages of the form described above to the cover member. In particular, since a liner guide is used in various uses, also the shape of the cover member is various, and diverse specifications are necessary. However, in conventional technology typified by Patent Literature 1 above, it is necessary that the design of the cover member including lubricant supply passages be altered on a specification basis, and a cost increase is caused.

The present invention has been made in view of the issue present in conventional technology described above, and has an object in providing a new form of a cover member capable of being used for diverse specifications in common in a case of making side surface grease supply design of forming tunnel-like lubricant supply passages from a left side surface and a right side surface of the cover member toward a central portion of the cover member.

Means for Solving the Problems

According to the present invention, there is provided a motion guide device including: a track member having a rolling member rolling surface formed thereon; a movable member having a loaded rolling member rolling surface facing the rolling member rolling surface formed thereon and having a rolling member return passage extending substantially parallel to the loaded rolling member rolling surface; a pair of cover members provided at both a front end and a rear end in a moving direction of the movable member and each having a turnabout passage connecting the loaded rolling member rolling surface and the rolling member return passage together; a plurality of rolling members arranged freely rollably in an endless circulation passage composed of the loaded rolling member rolling surface, the rolling member return passage, and the turnabout passages; and a lubricant supply passage provided in at least one of the pair of cover members and configured to supply lubricant to the endless circulation passage, in which the lubricant supply passage includes at least a first lubricant supply passage formed to extend in a direction orthogonal to a longitudinal direction of the track member from at least one of a left side surface and a right side surface of the cover member, and a second lubricant supply passage connected to the first lubricant supply passage, and a passage shape in a place connected to the first lubricant supply passage of the second lubricant supply passage is configured as a diameter-expanded hollow section having a diameter more expanded than a passage shape of another place.

Effects of the Invention

According to the present invention, there is provided a new form of a cover member capable of being used for diverse specifications in common in a case of making side surface grease supply design of forming tunnel-like lubricant supply passages from a left side surface and a right side surface of the cover member toward a central portion of the cover member.

MODE FOR CARRYING OUT THE INVENTION

Hereinbelow, preferred embodiments for implementing the present invention are described using the drawings. Note that the following embodiments do not limit the invention according to each claim, and further the solution means of the invention does not necessarily need all the combinations of the features described in the embodiments.

Figure 1:
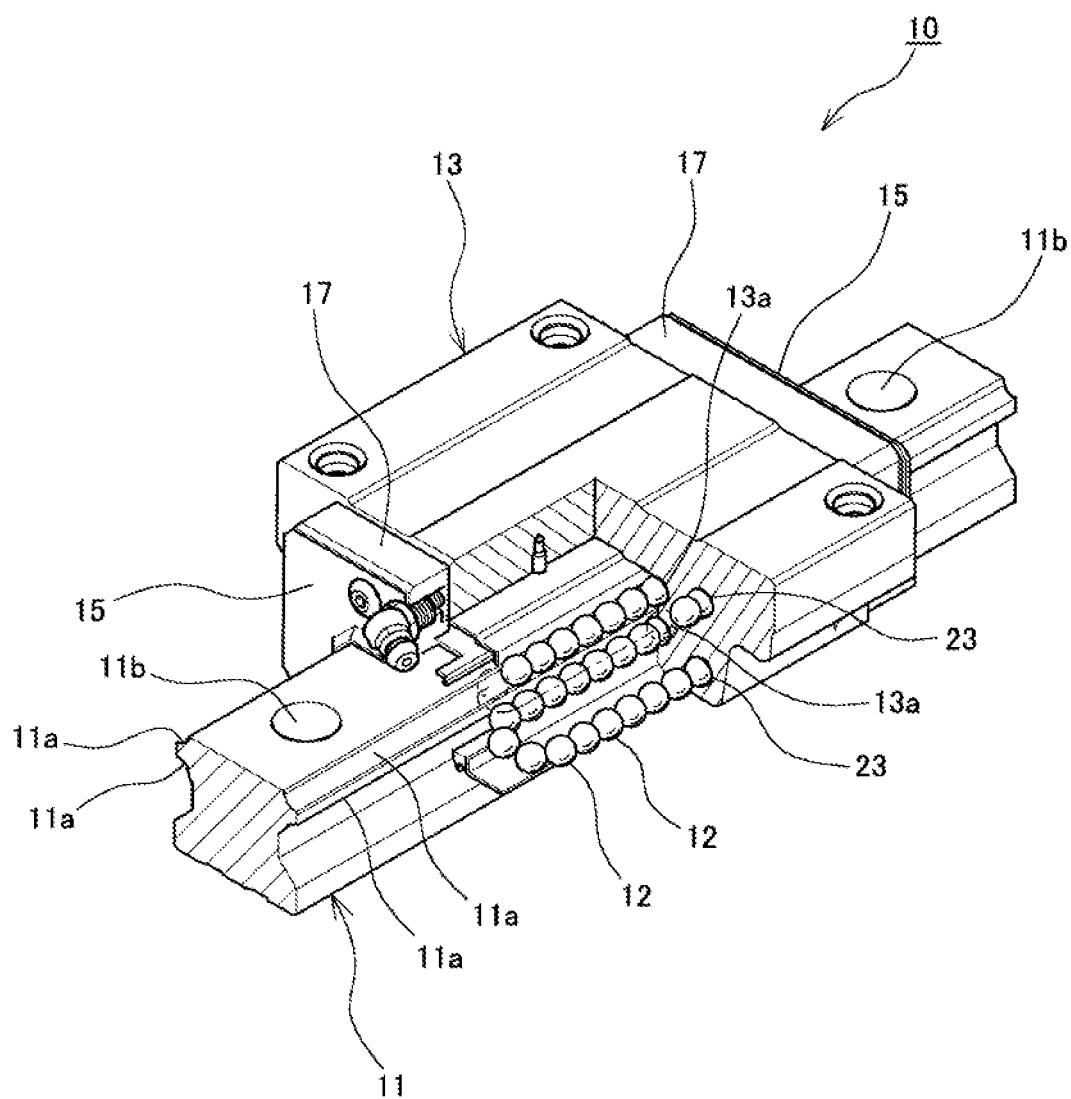
FIG. 1 is an external appearance perspective view illustrating a form of a liner guide device according to the present embodiment.
Figure 2:
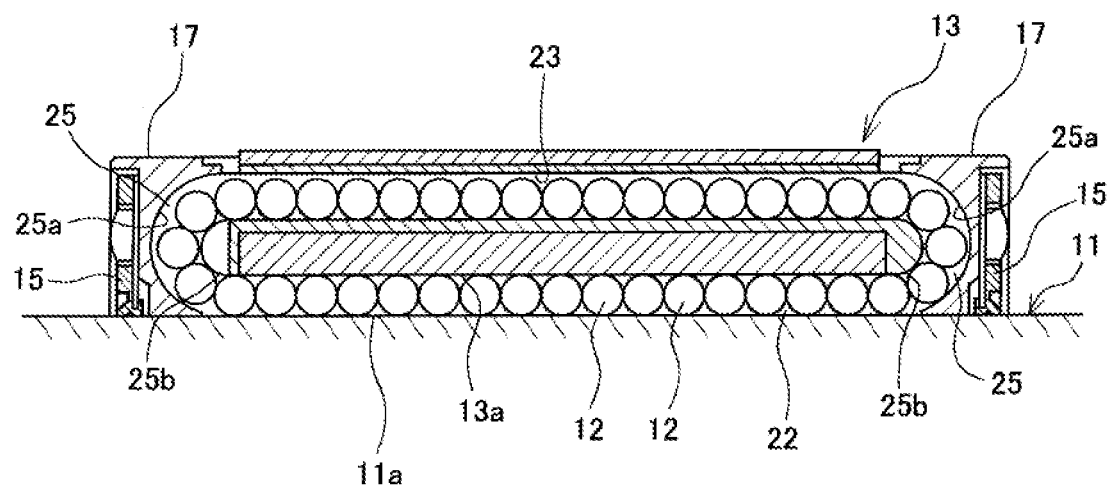
FIG. 2 is a cross-sectional view for describing an endless circulation passage included in the liner guide device shown by FIG. 1.

First, an overall configuration of a liner guide device 10 as a motion guide device according to the present embodiment is described using FIG. 1 and FIG. 2. Here, FIG. 1 is an external appearance perspective view illustrating a form of a liner guide device according to the present embodiment. Further, FIG. 2 is a cross-sectional view for describing an endless circulation passage included in the liner guide device shown by FIG. 1.

The liner guide device 10 as a motion guide device according to the present embodiment includes a track rail 11 as a track member and a movable block 13 as a movable member attached slidably to the track rail 11 via balls 12 installed as a large number of rolling members. In the track rail 11, bolt holes 11b for attaching the track rail 11 to a base by passing bolts as attachment means from the upper surface to the lower surface of the track rail 11 are formed at equal intervals. The track rail 11 can be installed fixedly to a basal surface by using these bolt holes 11b. Further, the track rail 11 is a long-length member having a cross section orthogonal to its longitudinal direction formed in a substantially rectangular shape, and on its surface, rolling member rolling surfaces 11a as track surfaces serving as tracks for the rolling of balls 12 are formed throughout the full length of the track rail 11.

The track rail 11 may be formed so as to extend in a straight line, or may be formed so as to extend in a curved line. Further, the number of rolling member rolling surfaces 11a illustrated in FIG. 1 and FIG. 2 is a total of four, i.e., two on the left side and two on the right side, but the number may be arbitrarily altered in accordance with the use, etc. of the liner guide device 10.

On the other hand, in the movable block 13, loaded rolling member rolling surfaces 13a as track surfaces are provided in positions individually corresponding to the rolling member rolling surfaces 11a. The rolling member rolling surface 11a of the track rail 11 and the loaded rolling member rolling surface 13a of the movable block 13 form a loaded rolling member rolling passage 22, and a plurality of balls 12 are sandwiched. Further, four rolling member return passages 23 each extending parallel to the respective rolling member rolling surface 11a are formed in the interior of the movable block 13.

Furthermore, a pair of cover members 17 and 17 are installed in both end sections in the moving direction of the movable block. Turnabout passages 25 are provided in each of these pair of cover members 17 and 17. This turnabout passage 25 is configured so as to be able to bind an end of the rolling member return passage 23 and an end of the loaded rolling member rolling passage 22 together. Therefore, the combination of one loaded rolling member rolling passage 22 and one rolling member return passage 23, and a pair of turnabout passages 25 and 25 binding them together constitute one endless circulation passage (see FIG. 2).

Then, a plurality of balls 12 are installed in the endless circulation passage composed of the loaded rolling member rolling passage 22, the rolling member return passage 23, and a pair of turnabout passages 25 and 25 so as to be capable of making endless circulation, and thereby the movable block 13 can make reciprocal motion relative to the track rail 11.

Further, in each of the pair of cover members 17 and 17, a pair of end seals 15 and 15 as seal members are installed, each so as to stop up the gaps between the movable block 13 and the track rail 11 on the outside of the respective pair of turnabout passages 25 and 25. This end seal 15 may include a lip section in a contact place with the track rail 11. Dustproof effect can be imparted to the liner guide device 10 by this lip section or the end seal 15 itself being in sliding contact with the track rail 11 without a gap.

Furthermore, in the present embodiment, a return plate not illustrated in FIG. 1 or FIG. 2 is sandwiched between the movable block 13 and each of the pair of cover members 17 and 17. This not-illustrated return plate exhibits, as a first function, the function of stopping up the surface of the movable block 13 for installing the cover member 17, and plays the role of enhancing sealing condition between the movable block 13 and the cover member 17 by stopping up the gap present between the movable block 13 and the cover member 17. Further, as a second function, a passage surface 25b on the inner peripheral side of the turnabout passage 25 is formed on the not-illustrated return plate, and is configured to form the turnabout passage 25 by cooperating with a passage surface 25a on the outer peripheral side formed on the cover member 17.

Hereinabove, an overall configuration of the liner guide device 10 according to the present embodiment is described. A configuration distinctive in the present embodiment is present in the shape of a lubricant supply passage molded to the cover member 17. Thus, next, the shape of the lubricant supply passage molded to the cover member 17 is described in detail using FIG. 3 to FIG. 10.

Figure 3:
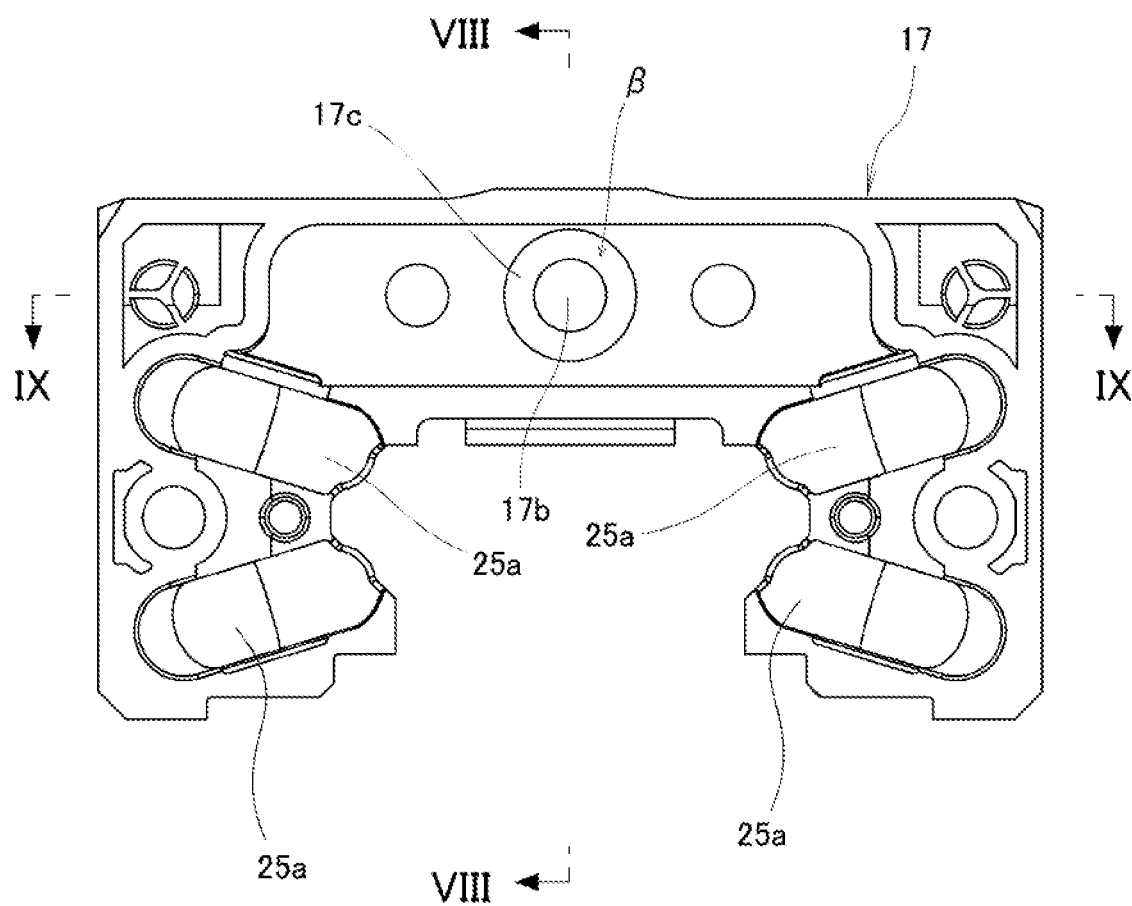
FIG. 3 is a diagram showing the side of the connection surface with a movable block of a cover member according to the present embodiment.
Figure 4:
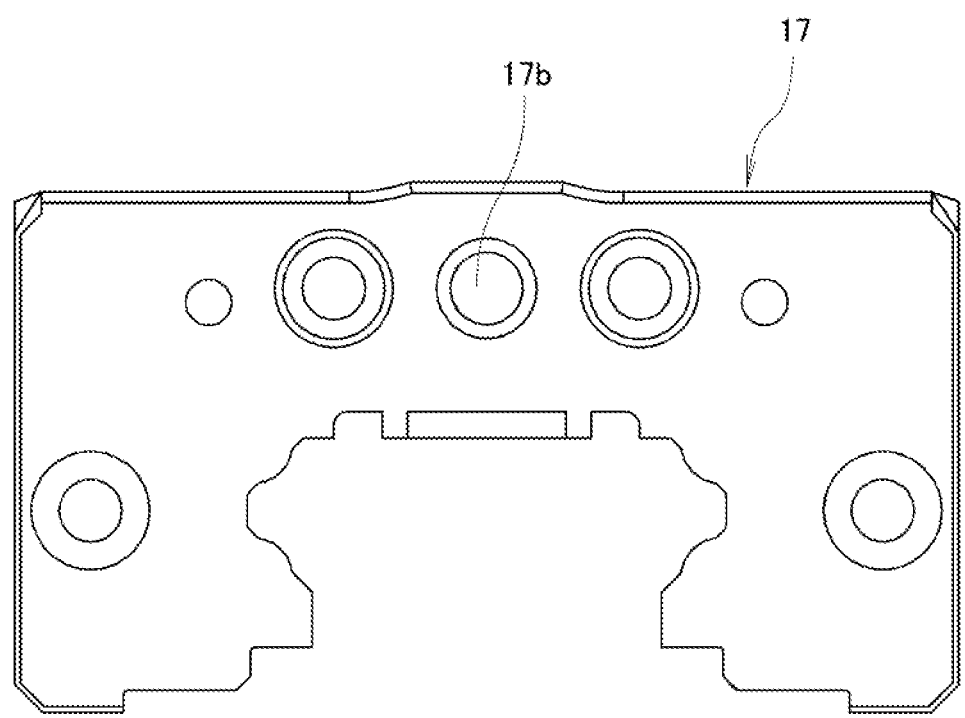
FIG. 4 is a diagram showing the side of the anti-connection surface with the movable block of the cover member according to the present embodiment.
Figure 5:
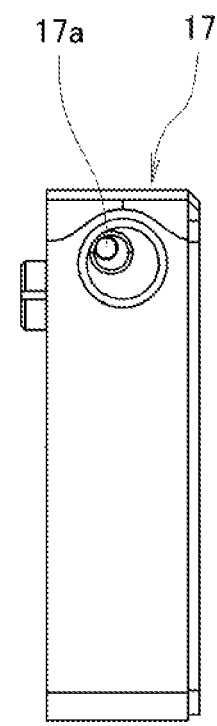
FIG. 5 is a diagram showing a right side surface of the cover member according to the present embodiment.
Figure 6:
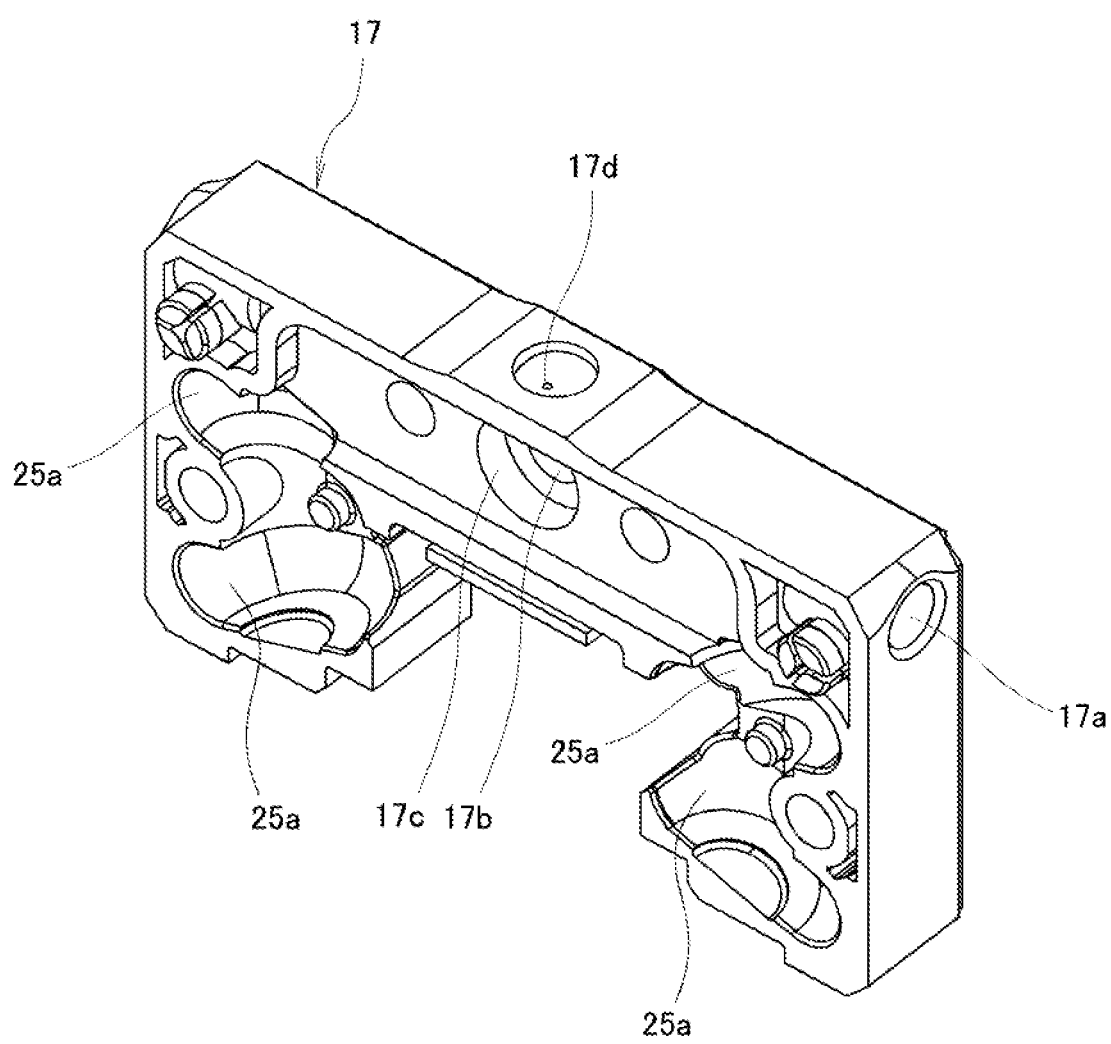
FIG. 6 is a perspective view in a case of the cover member according to the present embodiment being seen from above the side of the connection surface with the movable block.
Figure 7:
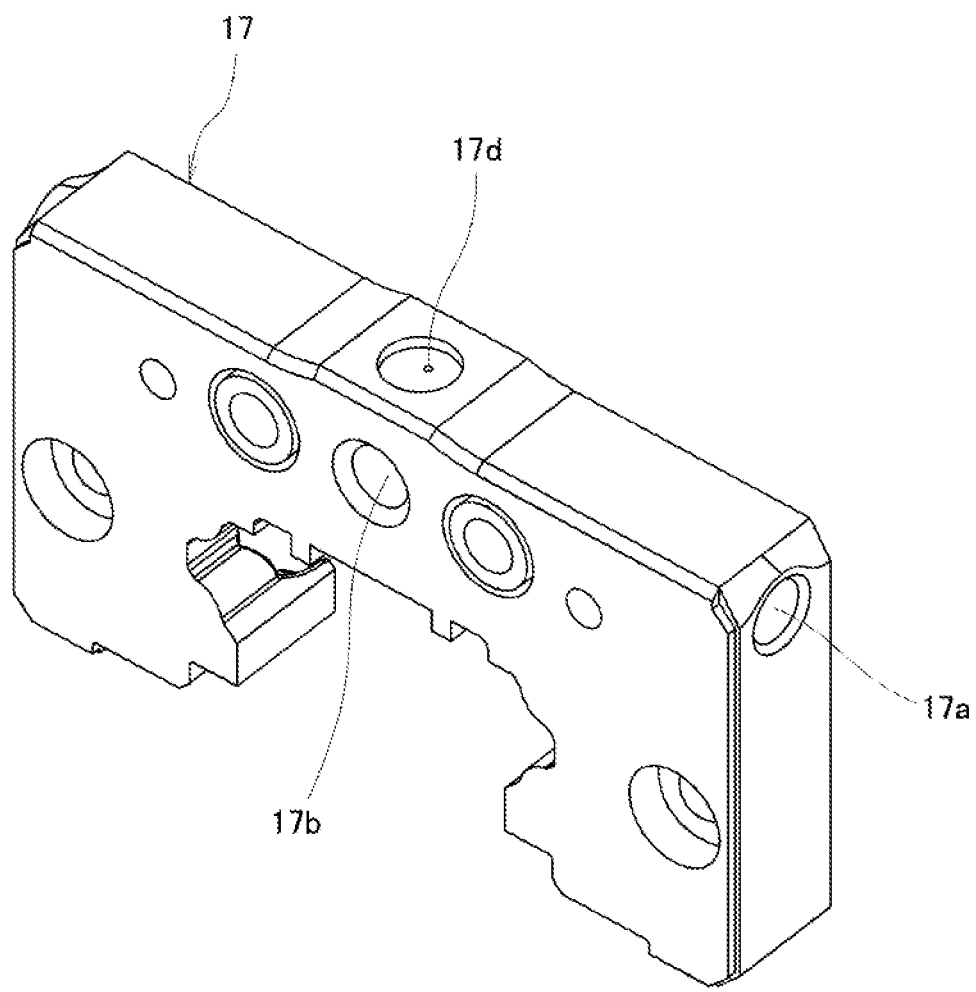
FIG. 7 is a perspective view in a case of the cover member according to the present embodiment being seen from above the side of the anti-connection surface with the movable block.
Figure 8:
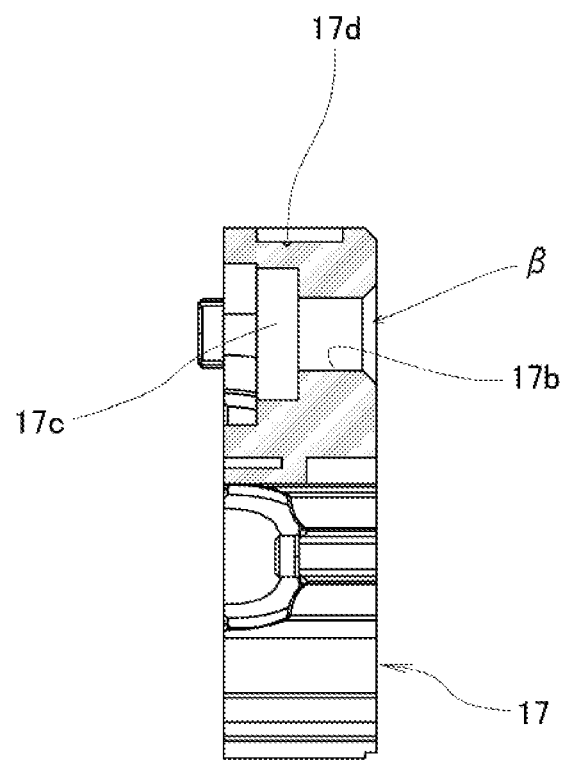
FIG. 8 is a cross-sectional view showing the reference-sign VIII-VIII line cross section in FIG. 3.
Figure 9:
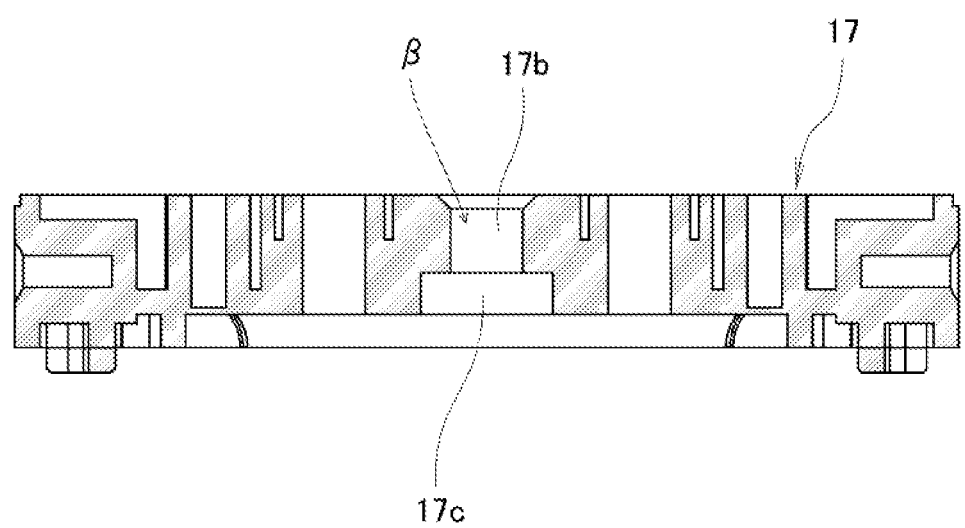
FIG. 9 is a cross-sectional view showing the reference-sign IX-IX line cross section in FIG. 3.
Figure 10:
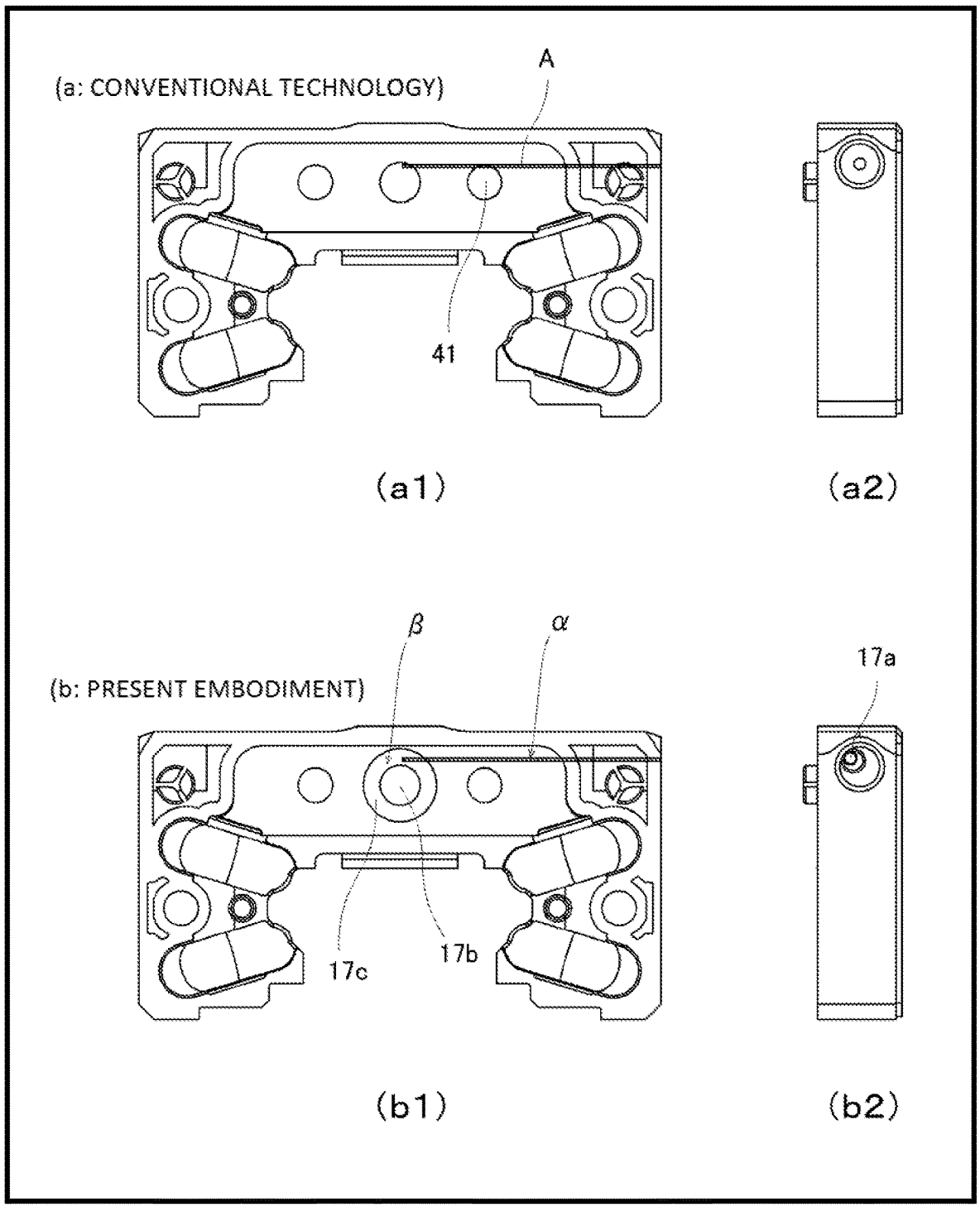
FIG. 10 is a diagram for describing contrast between the cover member according to the present embodiment and a cover member according to conventional technology.

Here, FIG. 3 is a diagram showing the side of the connection surface with the movable block 13 of the cover member according to the present embodiment, and FIG. 4 is a diagram showing the side of the anti-connection surface with the movable block 13 of the cover member according to the present embodiment. Note that the not-illustrated return plate described above is installed on the surface side shown by FIG. 3, and end seals 15 are installed on the surface side shown by FIG. 4. Further, FIG. 5 is a diagram showing a right side surface of the cover member according to the present embodiment. Furthermore, FIG. 6 is a perspective view in a case of the cover member according to the present embodiment being seen from above the side of the connection surface with the movable block 13, and FIG. 7 is a perspective view in a case of the cover member according to the present embodiment being seen from above the side of the anti-connection surface with the movable block 13. Moreover, FIG. 8 is a cross-sectional view showing the reference-sign VIII-VIII line cross section in FIG. 3, and FIG. 9 is a cross-sectional view showing the reference-sign IX-IX line cross section in FIG. 3. Moreover, FIG. 10 is a diagram for describing contrast between the cover member according to the present embodiment and a cover member according to conventional technology.

As shown in FIG. 3, the cover member 17 according to the present embodiment is a member having the passage surface 25a on the outer peripheral side of the turnabout passage 25 formed on the side of the connection surface with the movable block 13. Then, as shown in FIG. 5, in an upper position of each of the left side surface and the right side surface of the cover member 17, a side surface grease pouring hole 17a for supplying lubricant is formed from each of the left side surface and the right side surface of the cover member 17 toward a central portion, by forming a tunnel-like lubricant supply passage (a first lubricant supply passage α in FIG. 10 described later).

Further, a lubricant supply passage (a second lubricant supply passage β formed from an end section on the outer side of the cover member 17 toward the side of the connection surface with the movable block 13 is formed in a central portion of the cover member 17 according to the present embodiment. That is, as shown by (b1) of FIG. 10(b), among the lubricant supply passages included in the liner guide device 10 as a motion guide device according to the present embodiment, the first lubricant supply passage α formed to extend in the horizontal direction from, of the cover member 17, at least one of the left side surface and the right side surface parallel to the longitudinal direction of the track rail 11 toward a central portion, and the second lubricant supply passage β contacting with this first lubricant supply passage α and formed in the central portion of the cover member 17 are formed in the cover member 17.

Note that a third lubricant supply passage for distributing lubricant equally from the second lubricant supply passage β to each endless circulation passage is formed in the not-illustrated return plate, and a suitable lubricant supply system is obtained in the liner guide device 10 according to the present embodiment by using the first lubricant supply passage to the third lubricant supply passage.

Then, in the present embodiment, the second lubricant supply passage β out of the two lubricant supply passages included in the cover member 17 described above is characterized by the fact that the passage shape of a place connected to the first lubricant supply passage is configured as a diameter-expanded hollow section 17c having a diameter more expanded than the passage shape of another place. That is, as shown in FIG. 6, FIG. 8, and FIG. 9, the second lubricant supply passage β according to the present embodiment is configured to have a circular cylindrical hollow section 17b formed to extend from an end section surface on the outer side in the central portion of the cover member 17 in the longitudinal direction of the track rail 11 and the diameter-expanded hollow section 17c having a passage diameter more expanded than the passage diameter of this circular cylindrical hollow section 17b. Such a configuration of the second lubricant supply passage β according to the present embodiment has an advantageous feature as compared to conventional technology.

That is, as shown by FIG. 10(a), in a case of conventional technology not having a shape equivalent to the diameter-expanded hollow section 17c according to the present embodiment, if it is attempted to form a first lubricant supply passage A from a side surface side of a cover member toward a central portion, a bolt attachment hole 41 or the like is an obstacle, and hence it has been necessary to perform a design alteration on the shape of the cover member each time. However, in a case of the second lubricant supply passage β according to the present embodiment including the diameter-expanded hollow section 17c, the flexibility of the formation place of the tunnel-like first lubricant supply passage α is expanded to a level equivalent to the dimensions of the shape of the diameter-expanded hollow section 17c. Hence, the first lubricant supply passage α can be formed while avoiding parts such as the bolt attachment hole 41. Therefore, according to the present embodiment, a form of the cover member 17 usable for diverse specifications in common can be provided in a case of performing side surface grease supply design of forming the tunnel-like first lubricant supply passage α from the left side surface or the right side surface of the cover member 17 toward the central portion of the cover member 17.

Note that, although the shape of the diameter-expanded hollow section 17c included in the second lubricant supply passage β according to the present embodiment is formed as a circular cylindrical hollow shape of a similar figure to the circular cylindrical hollow section 17b, various shapes may be employed as the shape of the diameter-expanded hollow section according to the present invention. For example, the diameter-expanded hollow section according to the present invention may be configured to have a circular arc shape in at least part of the passage shape forming the diameter-expanded hollow section. Specifically, for example, a shape such as a reverse semi-cylindrical shape obtained by cutting an upper side of the circular cylindrical hollow shape illustrated in the present embodiment in a straight line manner may be employed. Further, any shape such as a quadrangular shape or a triangular shape in a vertical cross-sectional view may be employed to the extent that similar working-effect to the present embodiment can be exhibited. A motion guide device usable for diverse specifications can be obtained by employing such a configuration.

Further, another lubricant supply passage may be connected from another direction to the diameter-expanded hollow section 17c included in the second lubricant supply passage β according to the present embodiment, in addition to the first lubricant supply passage α formed to extend in the horizontal direction from at least one of the left side surface and the right side surface of the cover member 17 toward the central portion. Specifically, grease supply from the upper surface side of the movable block 13 becomes possible by, as shown by FIG. 6 to FIG. 8, providing an upper surface grease pouring hole 17d on the upper surface side of the cover member 17 and forming a lubricant supply passage connected from this upper surface grease pouring hole 17d to the diameter-expanded hollow section 17c. By employing such a configuration, the range of grease supply design is expanded, and a motion guide device of any form can be obtained.

Furthermore, the shape of the diameter-expanded hollow section 17c included in the second lubricant supply passage β according to the present embodiment exhibits a meaningful effect in addition to the effect described above. The effect will now be described by adding FIG. 11 as a reference diagram. Here, FIG. 11 is a diagram for describing another effect possibly exhibited by the diameter-expanded hollow section 17c included in the second lubricant supply passage β according to the present embodiment.

Figure 11:
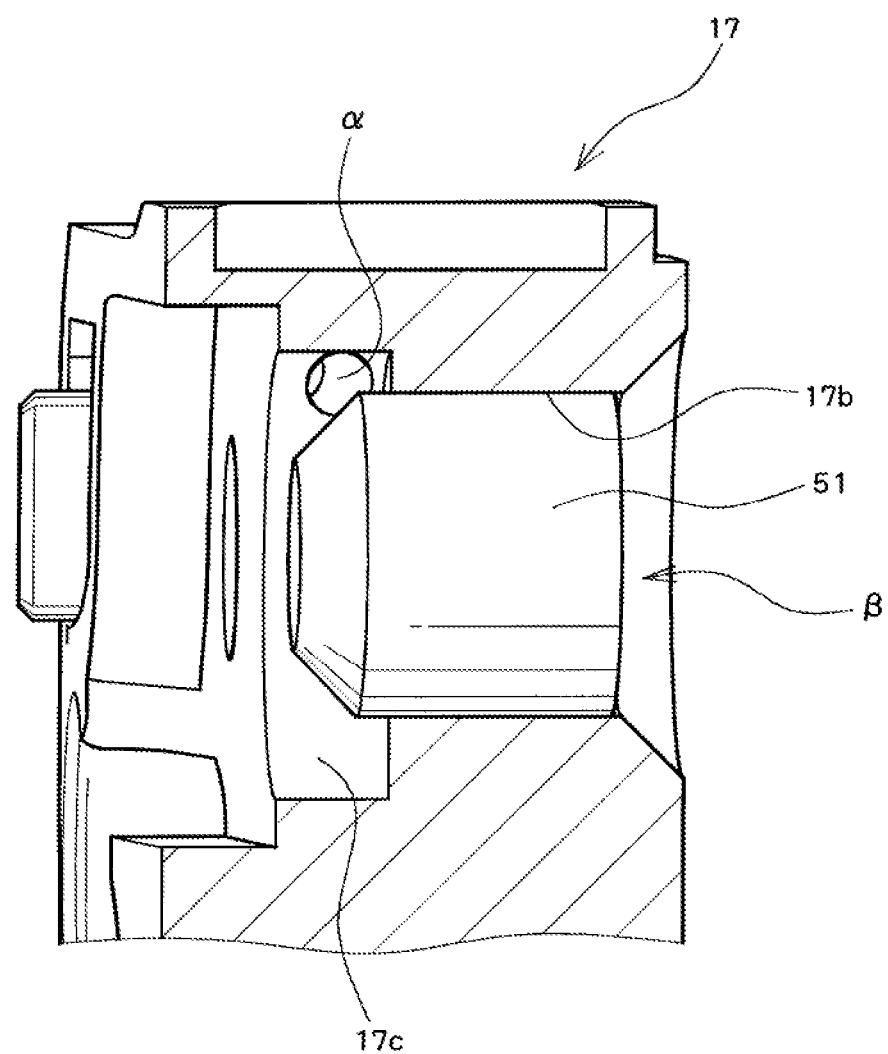
FIG. 11 is a diagram for describing another effect possibly exhibited by a diameter-expanded hollow section included in a second lubricant supply passage according to the present embodiment.

FIG. 11 shows a situation of a plug 51 being installed to the circular cylindrical hollow section 17b included in the second lubricant supply passage β according to the present embodiment. In a case of a form of the diameter-expanded hollow section 17c according to the present embodiment not existing to the second lubricant supply passage like in conventional technology, there has been a possibility that, if the plug 51 is deeply pushed in, malfunctioning of stopping up the first lubricant supply passage α connected to the second lubricant supply passage β will occur. However, if the diameter-expanded hollow section 17c having a diameter more expanded than the passage shape of the circular cylindrical hollow section 17b is formed and the first lubricant supply passage α is connected to this diameter-expanded hollow section 17c like in the present embodiment, the plug 51 does not stop up the first lubricant supply passage α even if the plug 51 installed in the circular cylindrical hollow section 17b is deeply pushed in as shown in FIG. 11, and an effect of capability to ensure a passage for supplying lubricant suitably can be obtained.

Hereinabove, preferred embodiments of the present invention are described. However, the technical scope of the present invention is not limited to the range described in the above embodiments. Diverse alterations or improvements may be made to the above embodiments.

For example, the embodiment described above illustrates a form of configuring the movable block 13 as a movable member by installing end seals 15 and a return plate in the cover member 17 functioning as a direction conversion member. However, the application range of the present invention is not limited to the configuration of the present embodiment, but can encompass motion guide devices of all possible forms.

Further, a case of using the ball 12 as a rolling member is given as an example of the liner guide device 10 as a motion guide device according to the embodiment described above. However, the rolling member usable for the motion guide device according to the present invention is not limited to the ball 12, but motion guide devices using all possible rolling members such as rollers and runners are possible.

Further, in the liner guide device 10 as a motion guide device according to the embodiment described above, the second lubricant supply passage β is formed in a position almost in a central portion of an end section surface on the outer side of the cover member 17. However, the formation position of the second lubricant supply passage according to the present invention may also be, for example, a place deviated to either the left or the right from the position of the central portion of the end section surface on the outer side of the cover member 17.

It is clear from the description of the claims that also forms having such alterations or improvements can be included in the technical scope of the present invention.

REFERENCE NUMERALS

10: Liner guide device, 11: Track rail, 11a: Rolling member rolling surface, 11b: Bolt holes, 12: Ball, 13: Movable block, 13a: Loaded rolling member rolling surface, 15: End seal, 17: Cover member, 17a: Side surface grease pouring hole, 17b: Circular cylindrical hollow section, 17c: Diameter-expanded hollow section, 17d: Upper surface grease pouring hole, 22: Loaded rolling member rolling passage, 23: Rolling member return passage, 25: Turnabout passage, 25a: Passage surface on the outer peripheral side, 25b: Passage surface on the inner peripheral side, 41: Bolt attachment hole, 51: Plug, α: First lubricant supply passage, β: Second lubricant supply passage, A: First lubricant supply passage in conventional technology.

The invention claimed is:

1. A motion guide device comprising:
 a track member having a rolling member rolling surface formed thereon;
 a movable member having a loaded rolling member rolling surface facing the rolling member rolling surface formed thereon and having a rolling member return passage extending substantially parallel to the loaded rolling member rolling surface;

a pair of cover members provided at both a front end and a rear end in a moving direction of the movable member and each having a turnabout passage connecting the loaded rolling member rolling surface and the rolling member return passage together;

a plurality of rolling members arranged freely rollably in an endless circulation passage including the loaded rolling member rolling surface, the rolling member return passage, and the turnabout passages; and a lubricant supply passage provided in at least one of the pair of cover members and configured to supply lubricant to the endless circulation passage, wherein the lubricant supply passage includes at least a first lubricant supply passage formed to extend in a direction orthogonal to a longitudinal direction of the track member from at least one of a left side surface and a right side surface of the cover member, and a second lubricant supply passage connected to the first lubricant supply passage, and a passage shape in a place connected to the first lubricant supply passage of the second lubricant supply passage is configured as a diameter-expanded hollow section having a diameter more expanded than a passage shape of another place, and wherein the first lubricant supply passage is tunnel-shaped and connected to the diameter-expanded hollow section of the second lubricant supply passage.

2. The motion guide device according to claim 1, wherein the second lubricant supply passage is configured to have a circular cylindrical hollow section formed to extend from an end section surface on an outer side of the cover member in the longitudinal direction of the track member, and the diameter-expanded hollow section having a passage diameter more expanded than a passage diameter of the circular cylindrical hollow section.

3. The motion guide device according to claim 2, wherein the diameter-expanded hollow section is configured to have a circular arc shape in at least part of a passage shape forming the diameter-expanded hollow section.

4. The motion guide device according to claim 2, wherein the second lubricant supply passage is formed in a central portion of the cover member.

5. The motion guide device according to claim 1, wherein the diameter-expanded hollow section is configured to have a circular arc shape in at least part of a passage shape forming the diameter-expanded hollow section.

6. The motion guide device according to claim 5, wherein the second lubricant supply passage is formed in a central portion of the cover member.

7. The motion guide device according to claim 1, wherein the second lubricant supply passage is formed in a central portion of the cover member.

* * * * *